United States Patent
Barritault et al.

(10) Patent No.: US 11,548,439 B2
(45) Date of Patent: Jan. 10, 2023

(54) VEHICLE HORN CONTROL SYSTEM

(71) Applicant: Autoliv Development AB, Vargarda (SE)

(72) Inventors: Matthis Barritault, Poitiers (FR); Hugues Doursoux, Latillé (FR)

(73) Assignee: Autoliv Development AB, Vargarda (SE)

( * ) Notice: Subject to any disclaimer, the term of this patent is extended or adjusted under 35 U.S.C. 154(b) by 340 days.

(21) Appl. No.: 16/651,451

(22) PCT Filed: Sep. 19, 2018

(86) PCT No.: PCT/EP2018/075278
§ 371 (c)(1),
(2) Date: Mar. 27, 2020

(87) PCT Pub. No.: WO2019/063371
PCT Pub. Date: Apr. 4, 2019

(65) Prior Publication Data
US 2020/0282906 A1  Sep. 10, 2020

(30) Foreign Application Priority Data

Sep. 27, 2017 (FR) ..................................... 1758977

(51) Int. Cl.
*H01H 3/60* (2006.01)
*G01L 1/22* (2006.01)
*B60Q 5/00* (2006.01)
(52) U.S. Cl.
CPC ................ *B60Q 5/003* (2013.01); *G01L 1/22* (2013.01); *H01H 3/60* (2013.01); *H01H 2231/026* (2013.01)

(58) Field of Classification Search
CPC ........... B60Q 5/003; B60Q 5/001; G01L 1/22; H01H 3/60; H01H 13/14; H01H 13/52;
(Continued)

(56) References Cited

U.S. PATENT DOCUMENTS

| 2,454,242 A | 11/1948 | Wharam et al. |
| 5,283,404 A | 2/1994 | Prescaro, Jr. |

(Continued)

FOREIGN PATENT DOCUMENTS

| DE | 10 2006 016160 A1 | 7/2008 |
| DE | 10 2009 007777 A1 | 8/2010 |

(Continued)

OTHER PUBLICATIONS

International Search Report of the International Searching Authority for PCT/EP2018/075278 dated Mar. 14, 2019.

(Continued)

*Primary Examiner* — William A Bolton
(74) *Attorney, Agent, or Firm* — Foley & Lardner LLP

(57) ABSTRACT

The invention relates to a vehicle horn control system, installed on the steering wheel of a vehicle, comprising:
a base part (10),
a control device (52), which can move relative to the base part between a rest position and a depressed position,
shock-absorbing means comprising a deformable part (31) made from an elastomer material, said means being arranged between the base part and the control device in order to absorb vibrations; and
an electric circuit with at least one closed switch when the control device is in the rest position.

15 Claims, 4 Drawing Sheets

(58) Field of Classification Search
CPC ............. H01H 13/66; H01H 2221/062; H01H 2221/044; B60R 21/21658
USPC ............... 116/137 R, 142 R; 200/61.55, 530; 280/728.2, 731; 340/392.3, 384.6
See application file for complete search history.

(56) References Cited

U.S. PATENT DOCUMENTS

| | | | |
|---|---|---|---|
| 6,008,460 | A | 12/1999 | Demari |
| 6,119,545 | A | 9/2000 | Hosoi et al. |
| 6,236,301 | B1 * | 5/2001 | Langford ............... H01C 10/10 338/50 |
| 7,126,073 | B2 | 10/2006 | McLauchlan |
| 7,173,202 | B2 * | 2/2007 | Tsujimoto ........... B60R 21/2037 200/61.54 |
| 7,268,309 | B2 * | 9/2007 | Sugimoto ......... B60R 21/21658 200/61.54 |
| 7,464,959 | B2 | 12/2008 | Pillsbury, IV et al. |
| 7,887,088 | B2 * | 2/2011 | Worrell .................. B60Q 3/283 200/61.54 |
| 8,981,247 | B2 | 3/2015 | Sano |
| 9,007,190 | B2 | 4/2015 | Bosch et al. |
| 9,550,525 | B2 * | 1/2017 | Ishii ....................... B60Q 5/003 |
| 2006/0016613 | A1 | 1/2006 | McLauchlan |
| 2006/0197323 | A1 | 9/2006 | Pillsbury, IV et al. |
| 2011/0241850 | A1 | 10/2011 | Bosch et al. |
| 2013/0228440 | A1 | 9/2013 | Sano |
| 2017/0158126 | A1 * | 6/2017 | Lisseman ............... B60Q 5/003 |

FOREIGN PATENT DOCUMENTS

| | | |
|---|---|---|
| EP | 0 572 125 A1 | 12/1993 |
| EP | 0 841 674 A1 | 5/1998 |
| EP | 2 634 665 A2 | 9/2013 |
| FR | 1 036 725 A | 9/1953 |
| GB | 2 325 900 A | 12/1998 |
| JP | H01 302623 A | 12/1989 |
| JP | 2006-228620 A | 8/2006 |
| JP | 2008-146980 A | 6/2008 |
| JP | 2014-107074 A | 6/2014 |
| WO | 2010/089352 A1 | 8/2010 |

OTHER PUBLICATIONS

English translation of International Search Report of the International Searching Authority for PCT/EP2018/075278 dated Mar. 14, 2019.

Search Report of the Intellectual Property Office of the France for FR1758977 with search date of May 18, 2018.

* cited by examiner

VEHICLE HORN CONTROL SYSTEM

The present invention generally relates to a motor vehicle horn control system.

It is discussed in the prior art on horn control devices, otherwise known as horns. For example, document U.S. Pat. No. 6,119,545 describes a control system integrated into a steering wheel safety module, with a switch which changes status when the user presses a control device which is therefore movable. This system however has, notably, the disadvantage of requiring a long control stroke, as well as numerous components for guiding, stopping, i.e. positioning the movable parts of the control system. It also requires elastic return means to return the movable parts to the rest position, and due to the long stroke and the vibrations, it is difficult to accommodate adequate firmness to limit the vibrations while obtaining smooth control. Finally, based on the desired finish level, it may be required to provide a shock-absorbing function of the steering wheel frame, using the movable mass of the in-built parts of the control device.

Document JP2008146980A discloses a switch device with a touch function. Document DE102006016160A1 discloses a steering wheel with a switch. Document US20060197323A1 discloses a device to limit the movement of a safety module in relation to a steering wheel. Document U.S. Pat. No. 2,454,242A discloses a horn button construction. Document GB2325900A8 discloses a safety module assembly with axial and lateral elastic movement. Document EP572125A1 discloses a central horn switch of a safety module. Document FR1036725A discloses a push-button circuit switch.

One aim of the present invention is to resolve the disadvantages of the prior art mentioned hereinbefore, and in particular, first of all, to propose a horn control system which has a simple architecture, while having rapid control detection and a shock-absorbing function.

To that end, a first aspect of the invention relates to a vehicle horn control system, installed on the steering wheel of a vehicle, comprising:
  a base part,
  a control device, which can move relative to the base part between a rest position and a depressed position,
  shock-absorbing means comprising a deformable part made from an elastomer material, and arranged between the base part and the control device in order to absorb vibrations,
  an electric circuit comprising pressure detection means arranged to detect manual pressure on the control device, characterized in that the shock-absorbing means are arranged to form elastic return means in order to automatically exert a return force on the control device to return it from the depressed position to the rest position, and in that the return force is only generated by the deformable part.

The pressure detection means help to detect manual pressure by the user, which occurs as soon as the control part starts moving, thereby enabling rapid control detection. This also helps limit the command stroke and the clearances visible between the fixed and movable parts. The control system according to the invention therefore comprises shock-absorbing means notably with a deformable part, and it is proposed to take advantage of the immediate detection of the horn control by the pressure detection means in order to use the deformable part to also generate the return force. In other words, the deformable part constitutes the shock-absorbing means and the elastic return means, because the control stroke is small, or even very small (which makes it possible to guarantee a small variation in the return force).

Of course, without any pressure on the control device (in the rest position therefore), the horn is not activated.

It is possible to anticipate, for example, that the shock-absorbing means are compressed or pre-compressed to generate the force for maintaining and/or returning to the rest position and to guarantee that no pressure will be detected in the rest position. It is possible to anticipate that the shock-absorbing means are arranged so that compression of the deformable part generates the return force.

Advantageously, the pressure detection means comprise at least a switch comprising a movable contact terminal, built in to the control device, and a static contact terminal, secured to the base part. Advantageously, the switch is closed when the control device is in the rest position. The switch is closed when the control part is in the rest position, resulting in the device detecting an opening of the switch, which occurs as soon as the control part starts moving, thereby enabling rapid control detection. This also helps limit the command stroke and the clearances visible between the fixed and movable parts. The control system according to the invention therefore comprises shock-absorbing means notably with a deformable part, and it is proposed to take advantage of the immediate horn control detection by the opening of the switch in order to use the deformable part to also generate the return force. In other words, the deformable part constitutes the shock-absorbing means and the elastic return means, because the control stroke is small (which makes it possible to guarantee a small variation in the return force), thanks to the normally closed switch.

In other words, the invention relates to a vehicle horn control system, installed on the steering wheel of a vehicle, comprising:
  a base part,
  a control device, which can move relative to the base part between a rest position and a depressed position,
  shock-absorbing means comprising a deformable part made from an elastomer material, and arranged between the base part and the control device in order to absorb vibrations,
  an electric circuit with at least one switch comprising a movable contact terminal, built in to the control device, and a static contact terminal, secured to the base part, the switch being closed when the control device is in the rest position, characterized in that the shock-absorbing means are arranged to form elastic return means in order to automatically exert a return force on the control device to return it from the depressed position to the rest position, and in that the return force is only generated by the deformable part.

Advantageously, the deformable part is overmolded over a part of the control device.

Advantageously, the shock-absorbing means are arranged in order to absorb vibrations of frequencies ranging from 15 Hz to 35 Hz and preferentially ranging from 20 Hz to 25 Hz.

Advantageously, the control device comprises a control part. It may typically be a plate.

Advantageously, the control part is a support part arranged to accommodate a safety module. Thus, the positioning elements may also contribute to the retention of the safety module during its release which enables the number of components to be reduced and makes the device more compact.

Advantageously, the control part is a safety module lid or hood.

Advantageously, the deformable part is overmolded over the control part.

Advantageously, the control part comprises a metal part and a plastic part (for example a rigid plastic such as polyamide) overmolded over the metal part, and the deformable part is overmolded over the plastic part. This helps to ensure accurate and robust assembly at low cost. Indeed, when the safety module is connected to the control part, the parts between the safety module and the base part must withstand the stresses generated during the deployment of the safety module.

Advantageously, the control system comprises positioning means, arranged to impose the rest position on the control device, and the positioning means comprise the static contact terminal arranged to position the control device in the rest position, so as to close the switch when the control device is in the rest position, and the shock-absorbing means are arranged between the positioning means and one of the base part or of the control device. This makes it possible to propose a compact structure with effective shock absorption, as the switch is partially integrated into the positioning means. Such an accumulation of functions on the same parts reduces the number of components required.

Advantageously, the positioning means are stopping means comprising the static contact terminal which is arranged to form a mechanical stop for the control device when returned to the rest position by the return means. Such stopping means ensure the repeatable positioning of the control part in the rest position.

Advantageously, the stopping means comprise guiding means of the control part.

Advantageously, the movable contact terminal enters into mechanical abutment with the static contact terminal when the control part is in the rest position.

Advantageously, the positioning means are guiding means wherein:
one of the static contact terminal or the movable contact terminal forms part of or is a sliding bar and
the other of the static contact terminal or the movable contact terminal forms part of or is a slide,
so as to guide the control device returned to the rest position by the return means,
and wherein the shock-absorbing means are arranged around the slide.

Generally, the shock-absorbing means are guided in translation between the rest position and the depressed position. A sliding bar-slide assembly can be fitted, but it is also possible to talk of a rail-guide carriage assembly for example.

Furthermore, the shock-absorbing means are arranged to dampen the steering wheel via the control device along an activation direction (for example the above-mentioned translation direction) and also along a direction perpendicular to this activation direction. In fact, the control device and the shock-absorbing means form an oscillating mass-spring system connected to the steering wheel.

Advantageously:
the sliding bar comprises a terminal portion that conducts electricity, and an electrically insulating portion,
the slide is formed by a female part arranged at least partially around the sliding bar.

Advantageously, the positioning means comprise a rod forming the static contact terminal, which conducts electricity and which is part of the electric circuit. The rod itself is part of the electric circuit, as well as the contact surface of the static contact terminal.

Advantageously, the rod has a shoulder.

Advantageously, the base part is in material that conducts electricity and is part of the electrical circuit. Integration of the base part into the electrical circuit helps to simplify the cabling.

Advantageously, the base part is electrically insulated from the mass of the vehicle.

Advantageously, the stopping means comprise a shoulder rod, which conducts electricity, wherein the static contact terminal is attached to the shoulder rod, the device comprising electrical insulation means arranged between the rod and the static contact terminal.

Advantageously, the insulation means are an insulating washer, and wherein the static contact terminal is a metal washer attached to the insulating washer.

Advantageously, the insulation means are an insulating washer, wherein one of the static contact terminal or the movable contact terminal comprises two electrical tracks formed on the insulating washer, and wherein the other of the static contact terminal or the movable contact terminal is a conducting part of the control part, arranged to come into contact with the two electrical tracks when the control part is in the rest position.

Advantageously, the electrical insulation means are positioned between the shock-absorbing means and the positioning means.

Advantageously, the positioning means comprise an insulation part, electrically insulating, one of the static contact terminal or the movable contact terminal is a metal portion formed on the insulation part, and wherein the other of the static contact terminal or the movable contact terminal is a conducting part, arranged to come into contact with the metal portion when the control device is in the rest position.

Advantageously, the positioning means comprise an insulation part, electrically insulating, wherein one of the static contact terminal or the movable contact terminal comprises two electrical tracks formed on the insulation part, and wherein the other of the static contact terminal or movable contact terminal is a conducting part, arranged to come into contact with the two electrical tracks when the control device is in the rest position.

Advantageously, the deformable part is guided directly (in contact) by the positioning means. Indeed, the small stroke, less than 1 mm or even less than 0.5 mm, makes it possible to provide direct guidance by the deformable part Advantageously, the insulation part is nested on the deformable part.

Advantageously, the pressure detection means comprise at least one force sensor, such as a strain gauge, and the force sensor is pre-stressed when the control device is in the rest position. The demand on the control device is measured via a strain gauge type cell typically used in electronic scales. The role of the "switch" is played by a computer which processes the signal from the force sensor. Typically, the force sensor is pre-loaded or under stress when the control device is in the rest position, and the computer detects whether the load is less than a threshold for generating activation of the horn (manual pressure by the user reduces the load applied to the force sensor).

In the case of a force sensor in the form of a strain gauge, the displacement of the control device required to significantly change the load applied to the force sensor is very small, less than 0.1 mm. With such a small stroke, the deformable part can advantageously form elastic return means.

Advantageously, the deformable part comprises a deformable portion, one section of which, transversal to a displacement direction of the control device, is reduced in relation to a section of a base portion of the deformable part. This implementation helps to locate the deformation, and/or guarantee a moderate control force.

Advantageously, the deformable portion of the deformable part comprises material recesses.

Advantageously, the deformable part comprises a plurality of slots.

Advantageously, the deformable part has a hardness of 20 to 50 Shore A.

Advantageously, the deformable part is made from EPDM, or made from rubber (natural or synthetic).

Advantageously, the shock-absorbing means are in direct contact with a fixed feature of the base part along the activation direction, enabling the transition from the rest position to the depressed position.

Advantageously, the movable contact terminal is connected to the control device guide feature on the base part (or the positioning means), so as to reduce the chain of dimensions.

Advantageously, the control system comprises a plurality of switches each having a static contact terminal and a movable contact terminal, wherein the positioning means comprise a plurality of positioning units, wherein each positioning unit comprises one of the static contact terminals and a deformable part.

Advantageously, a stroke of the control device between the rest position and the depressed position is less than 1 mm.

Advantageously, the shock-absorbing means are arranged to exert a return force greater than 20N.

A second aspect of the invention relates to a vehicle steering wheel comprising a control system in accordance with the first aspect of the invention.

A third aspect of the invention relates to a motor vehicle comprising a vehicle steering wheel in accordance with the second aspect of the invention.

Other features and benefits of the present invention will be seen more clearly from reading the following detailed description of several embodiments of the invention, provided by way of a non-limiting example and illustrated by the appended drawings, wherein:

FIG. 1 depicts a horn control system mounted on a steering wheel, according to a first embodiment of the invention, and which comprises:

Figure 1:
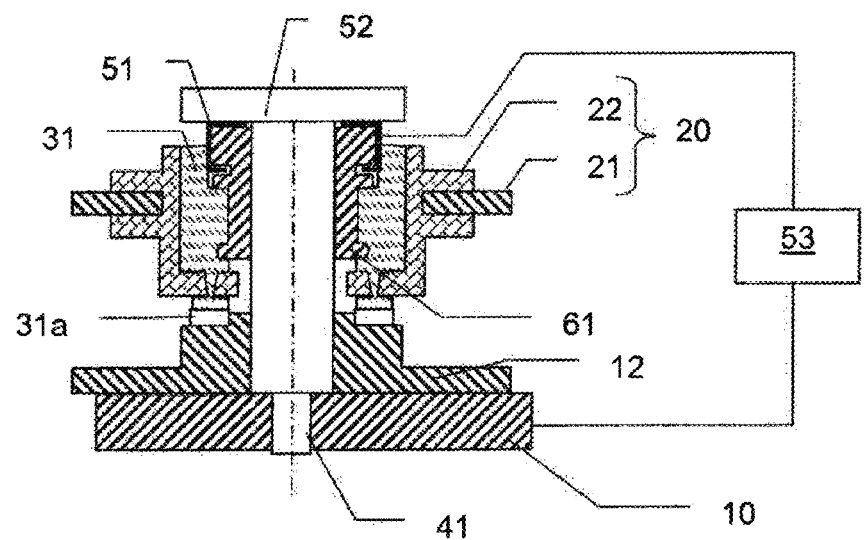
FIG. 1 depicts a first embodiment of a horn control system, in a rest position.

a frame 10 of the steering wheel, forming a base part, a shoulder screw 41, attached to the frame 10, a panel 20 comprising a plate 21 with a rigid plastic overmolding 22 (polyamide for example), guided by a cylindrical part of the shoulder screw 41, a deformable part 31 overmolded over the rigid plastic overmolding 22, an insulation part 61 inserted in the deformable part 31 and acting as a guide ring around the cylindrical portion of the shoulder screw 41, a washer 51, built in to the panel 20 as it is held by hooks anchored into the insulation part 61, optionally, a support part 12, which may for example be an electronics unit.

Figure 2:
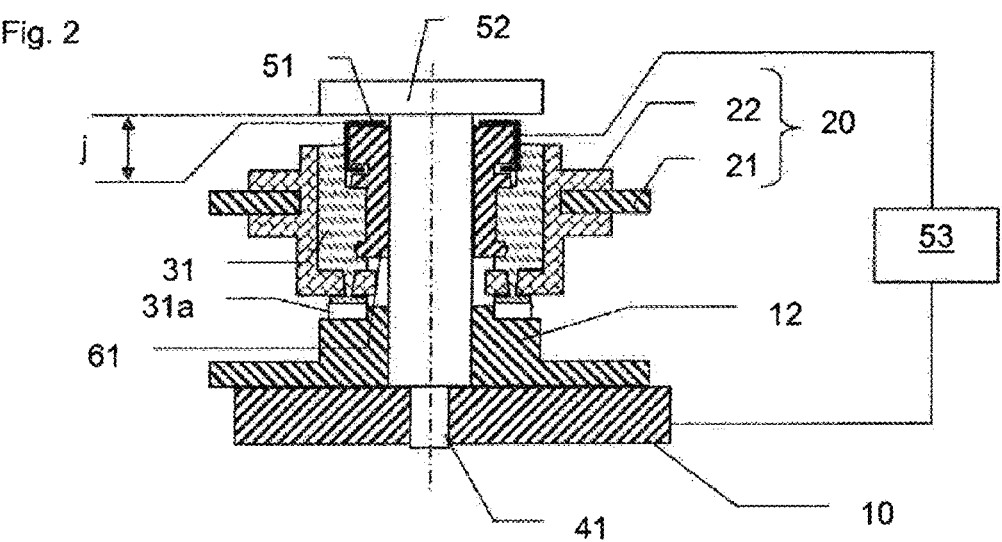
FIG. 2 depicts the control system from FIG. 1 in a depressed position.

The panel 20 is pushed upwards in FIG. 1 by the deformable part 31, it is therefore in the rest position, and the panel 20 may slide along the shoulder screw 41 to reach a depressed position, as shown in FIG. 2. The panel 20 thus forms a control device which can be pushed from the rest position in FIG. 1 to the depressed position in FIG. 2 by a user when s/he wants to sound the horn.

Typically, the panel 20 has an in-built safety module (an air bag) and the user presses on the latter (or its cover) to activate the horn. The safety module is therefore built in to the panel 20 and is movable with respect to the frame 10 of the steering wheel. However, the control device may be only a lid or a cover of the safety module in another embodiment.

To limit the vibrations in the frame 10 and the rim (not shown) of the steering wheel, the deformable part 31 (made from rubber or made from elastomer such as EPDM (ethylene propylene diene monomer)) is inserted between the frame 10 and the movable parts forming the control device (the panel 20 and its in-built components). In the present case, the deformable part 31 is overmolded over the rigid plastic overmolding 22 of the panel 20, the material of the deformable part 31 passing through holes provided in the rigid plastic overmolding 22. Furthermore, the deformable part 31 comprises a groove which receives a shoulder of the insulation part 61, which makes it possible to secure the parts to enable the sliding movement on the shoulder screw 41.

In the control system of FIG. 1, the shoulder screw 41 with the washer 51 form positioning means and in particular stopping means, for positioning the panel 20 in the rest position, since it is pushed back there by the deformable part 31.

To detect the movement of the panel, the invention proposes forming an electrical switch with the washer 51 which forms a movable contact terminal, and a surface 52 of the shoulder of the shoulder screw 41, which then forms a static contact terminal.

An electrical circuit is then formed by:

the frame 10, the shoulder screw 41, the static contact terminal (the surface 52), the movable contact terminal (the washer 51), an electronics unit 53 linked on one hand to the frame 10 and on the other to the washer 51, and which is arranged to detect the opening of the electric circuit, i.e. the moment when the washer 51 is no longer in physical and/or electrical contact with the surface 52 as shown in FIG. 2.

As a consequence, control detection takes place the moment the panel 10 is moved, which procures very rapid detection, and this makes it possible to limit the stroke (represented by clearance "j" on FIG. 2) of the panel at very low values, i.e. less than 1 mm. It is therefore possible to use the stiffness of the deformable part 31 and to provide it bearing against the support part 12 to exert a return force on the panel 20, as the stroke is small (therefore the elastic force increases very little along this small stroke), and it is not even necessary to reach the stop at the end of the stroke to set off the horn. As a consequence, only the deformable part 31 generates a return force on the panel 20 to push the latter back to the rest position, which provides a simple structure.

To limit the deformations and the pushing forces, the deformable part comprise slots 31a in the lower section, at the level of its contact with the support part 12. This makes it possible to limit the increase in pushing force, and to leave the deformable part the space to deform itself when transitioning from the rest position in FIG. 1 to the depressed position in FIG. 2.

In particular, it is possible to provide a stroke less than or equal to 1 mm and preferentially to 0.5 mm, or even less than or equal to 0.3 mm. As a consequence, at the movable trim parts, it is possible to provide a smaller clearance with the static trim parts of the steering wheel than those seen in the prior art. For the prior art, there's a clearance of around 4 mm, and the invention therefore allows this clearance to be reduced to values lower than 2 mm, which improves the quality perceived by the client.

In the alternative case in which the pressure detection means comprise a force sensor, the stroke is very small (less than 0.1 mm for example), so that the clearances between the trim parts can be reduced further.

Several shoulder screws 41 (typically three) can of course be provided to guide the panel 20, in order to form several positioning units or several stopping units, of identical structure to that of FIGS. 1 and 2, with the option of forming a switch at each stopping unit. All these switches can be implemented in series, or in parallel from the same electrical circuit with a single electronics unit 53, or an electrical circuit for each switch of each terminal unit can be implemented with an electronics unit 53 to provide several horn activation options: as soon as at least one switch is on, at least two switches are on, or all of the switches are on.

Figure 3:
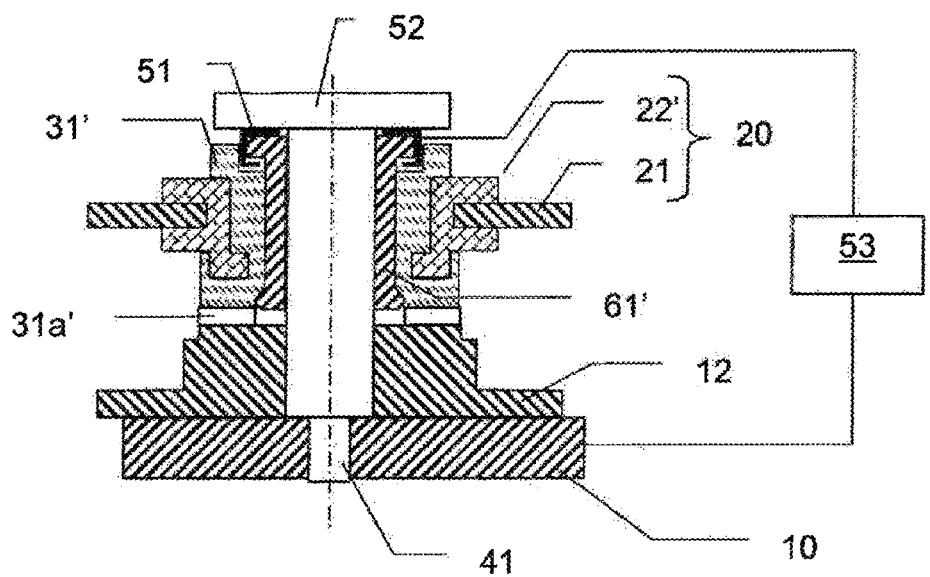
FIG. 3 depicts a second embodiment of a horn control system, in a rest position.
Figure 4:
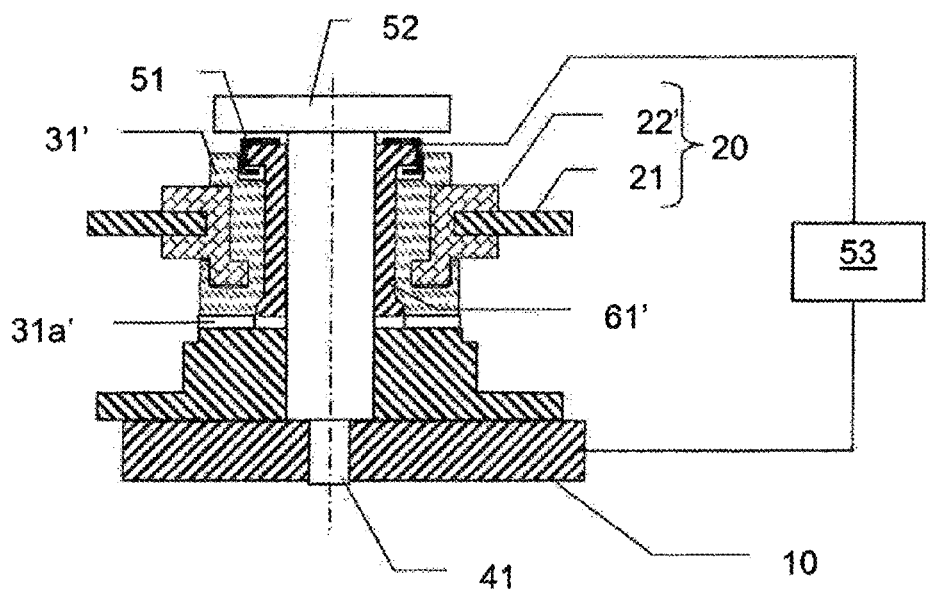
FIG. 4 depicts the control system from FIG. 3 in a depressed position.

FIGS. 3 and 4 depict a second embodiment of the invention. This second embodiment only differs from the first embodiment in terms of the assembly of the deformable part 31'. The features common to the first embodiment and which have already been described will not be described again.

In the present case, the deformable part 31' is overmolded around the rigid plastic overmolding 22', and the insulation part 61' has a height greater than that of the deformable part 31', and a shoulder at each end, to ensure secure axial connection, along the direction of sliding.

FIG. 3 depicts the system in the rest position, and FIG. 4 depicts the system in the depressed position, with the electric circuit open. The presence of slots 31a' should also be noted, which make it possible to limit the variations in pushing forces generated by the deformable part 31' which absorbs the vibrations, and generates the return force applied to the panel 20.

Figure 5:
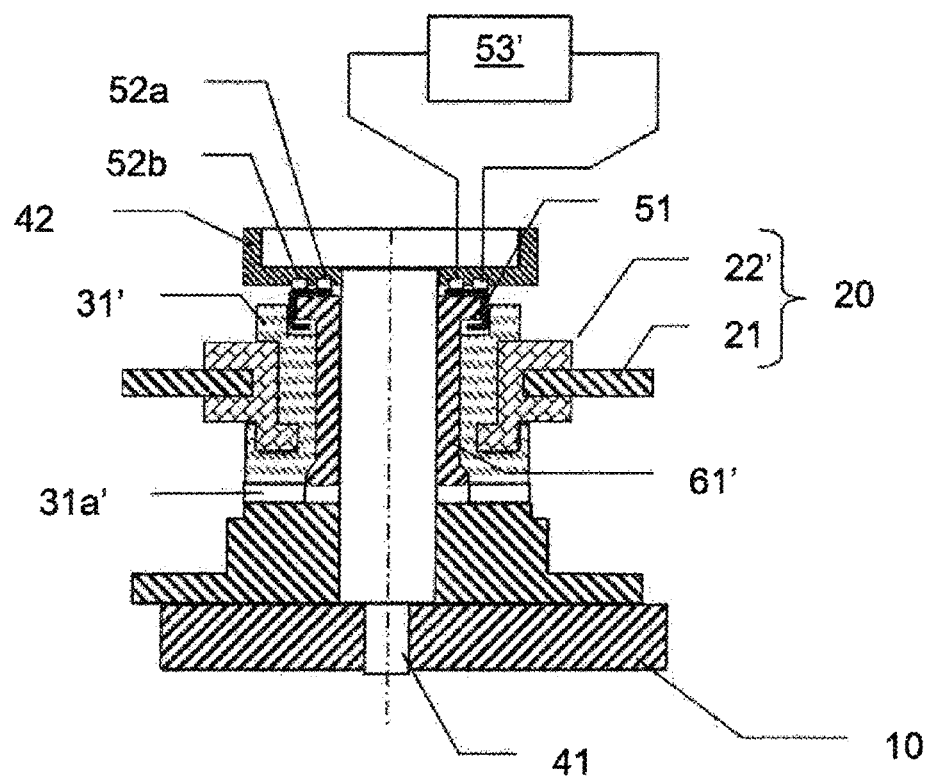
FIG. 5 depicts a third embodiment of a horn control system, in a rest position.
Figure 6:
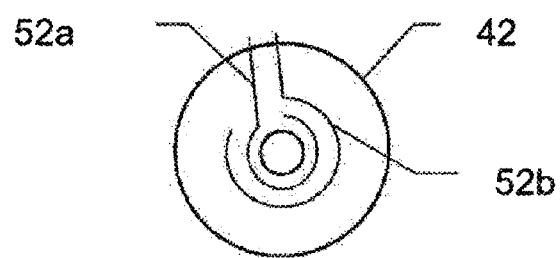
FIG. 6 depicts a detail of the control system from FIG. 5.

FIGS. 5 and 6 depict a third embodiment of the invention. This third embodiment only differs from the second embodiment in terms of the electrical circuit. The features already described will not be described again.

In the present case, the electrical circuit is formed by:
two tracks 52a and 52b formed on an insulating washer 42 secured to the head of the shoulder screw 41, and forming a static contact terminal,
a washer 51 secured to the insulation part 61', and forming a movable contact terminal,
the electronics unit 53' linked on one hand to the track 52a and on the other to the track 52b.

In the present case, insulation means in the form of the insulating washer 42 are inserted between the head of the shoulder screw 41 and the two contact tracks 52a and 52b. As a consequence, the electrical circuit does not include the shoulder screw 41, nor the frame 10. As in the first and second embodiment above, the static contact terminal and the movable contact terminal form stopping means and enter into mechanical abutment to close the electric circuit as soon as the panel 20 returns to the rest position (FIG. 5).

The contact is lost as soon as the panel 20 is moved to go into the depressed position. In particular, the washer 51 simultaneously makes contact with the tracks 52a and 52b, so as to conduct the current from one to the other. This implementation makes it possible to simplify the connection cabling with the electronics unit since the cabling is only supported by a single part, the shoulder screw 41.

Typically, the horn is supplied with strong current (greater than 4 amps), whereas the electric circuit of the control system is supplied with weak current (less than 1 amp) to limit any risk of electric arc between the static contact terminal and the movable contact terminal.

FIG. 6 depicts a view from above of the insulating washer 42, with the two tracks 52a and 52b, which can be printed, etched or adhesively bonded to the insulating washer 42.

Figure 7:
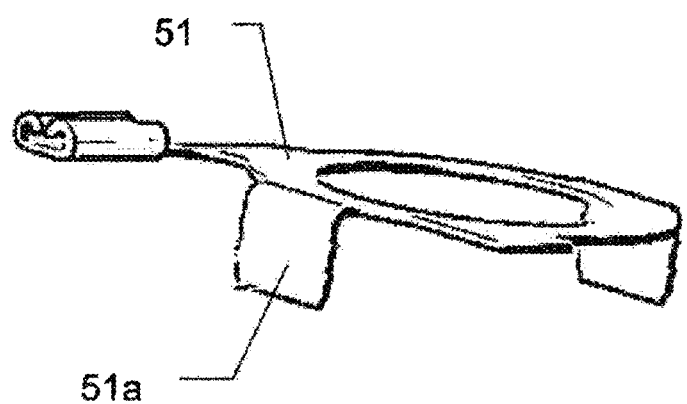
FIG. 7 depicts a part of the control device from FIG. 1.

FIG. 7 depicts a view of the washer 51, which comprises an electrical connection interface, and two clip tabs 51a to be attached to the insulation part 61.

It will be understood that various modifications and/or improvements obvious to those skilled in the art can be made to the different embodiments of the invention described in the present description, without going beyond the scope of the invention as defined by the appended claims.

In particular, it may be intended to propose a mechanical end of travel stop for the control device, to form a clear abutment, but this is not strictly necessary, particularly in the case where a deformable part comprises slots. Indeed, once the slots have been deformed, any additional depression will cause a significant increase in the depressing force applied by the user, who will feel an effect similar to an end of travel stop.

It is also possible to provide a normally-open switch to detect the depression of the movable part.

Furthermore, it is noted that all the embodiments described can be combined with each other, provided that they are compatible.

The invention claimed is:
1. A vehicle horn control system, arranged to be installed on a steering wheel of a vehicle, comprising:
a base part,
a control device, which can move relative to the base part between a rest position and a depressed position,
a shock-absorbing feature comprising a deformable part made from an elastomer material, and arranged between the base part and the control device in order to absorb vibrations,
an electric circuit comprising a pressure detection feature arranged to detect manual pressure on the control device, wherein the pressure detection feature comprises a static contact terminal, secured to the base part, and at least one switch comprising a movable contact terminal, built in to the control device and radially disposed about the static contact terminal,
wherein the shock-absorbing feature is arranged to form an elastic return feature in order to automatically exert a return force on the control device to return the control device from the depressed position to the rest position, and in that the return force is only generated by the deformable part.
2. The control system according to claim 1, wherein the switch is closed when the control device is in the rest position.
3. The control system according to claim 2, comprising a positioning feature, arranged to impose the rest position on the control device, characterized in that the positioning feature comprises the static contact terminal arranged to position the control device in the rest position, so as to close the switch when the control device is in the rest position, and in which the shock-absorbing feature is arranged between the positioning feature and one of the base part or of the control device.

4. The control system according to claim 3, wherein the support part is a stop comprising the static contact terminal which is arranged to form a mechanical stop at the control device returned to the rest position by the return feature.

5. The control system according to claim 3, wherein the positioning feature is a guiding feature, wherein:
- a first of the static contact terminal or the movable contact terminal forms part of a sliding bar and
- a second of the static contact terminal or the movable contact terminal forms part of a slide, such that the static contact terminal and the movable contact terminal are slidable relative to one another,
- so as to guide the control device returned to the rest position by the return feature,
- and wherein the shock-absorbing feature is arranged around the slide.

6. The control system according to claim 3, wherein the positioning feature comprises an insulation part, electrically insulating, wherein a first of the static contact terminal or the movable contact terminal is a metal portion formed on the insulation part, and wherein a second of the static contact terminal or the movable contact terminal is a conducting part, arranged to be in contact with the metal portion when the control device is in the rest position, and wherein the insulation part is nested in the deformable part.

7. The control system according to claim 3, wherein the positioning feature comprises an insulation part, electrically insulating, wherein a first of the static contact terminal or the movable contact terminal comprises two electrical tracks formed on the insulation part, and wherein a second of the static contact terminal or the movable contact terminal is a conducting part, arranged to come into contact with the two electrical tracks when the control device is in the rest position, and wherein the insulation part is nested in the deformable part.

8. The control system according to claim 1, wherein the pressure detection feature comprises at least one force sensor, such as a strain gauge, and wherein the force sensor is pre-stressed when the control device is in the rest position.

9. The control system according to claim 1, wherein the deformable part comprises a deformable portion, one section of which, transversal to a displacement direction of the control device, is reduced in relation to a section of a base portion of the deformable part.

10. The control system according to claim 9, wherein the deformable portion of the deformable part comprises material recesses.

11. The control system according to claim 9, wherein the deformable part comprises a plurality of slots.

12. The control system according to claim 1, wherein the deformable part is overmolded over a control device part.

13. The control system according to claim 1, wherein a stroke of the control device between the rest position and the depressed position is less than 1 mm.

14. A vehicle steering wheel comprising a control system according to claim 1.

15. A motor vehicle comprising a vehicle steering wheel according to claim 14.

* * * * *